June 9, 1931.  G. R. LE SAUVAGE  1,809,172
COOKING APPARATUS
Filed Nov. 13, 1928  2 Sheets-Sheet 1

INVENTOR
George Rosa Le Sauvage
BY
ATTORNEY

June 9, 1931.  G. R. LE SAUVAGE  1,809,172
COOKING APPARATUS
Filed Nov. 13, 1928  2 Sheets-Sheet 2

INVENTOR
George Ross Le Sauvage
BY
ATTORNEY

Patented June 9, 1931

1,809,172

UNITED STATES PATENT OFFICE

GEORGE ROSS LE SAUVAGE, OF BUFFALO, NEW YORK, ASSIGNOR TO REPUBLIC METALWARE COMPANY, OF BUFFALO, NEW YORK, A CORPORATION OF NEW YORK

COOKING APPARATUS

Application filed November 13, 1928. Serial No. 319,104.

My invention relates in general to a cooking apparatus and more particularly to a device for roasting wieners, commonly called "hot dogs".

The principal objects of my invention have been to provide a device which shall be easily cleaned so that it may be kept in a sanitary condition; one which shall be convenient to use; and one which shall be attractive in appearance.

Another object has been to provide a device of this nature having a grid element which may be used to close the device so as to retain the heat therein while the roasted wieners are being removed from the grid element, or while others are being placed therein.

Moreover, my device is provided with a casing having glass windows, whereby the roasting operation may be observed.

The above objects and advantages have been accomplished by the device shown in the accompanying drawings, of which:

Figure 1:
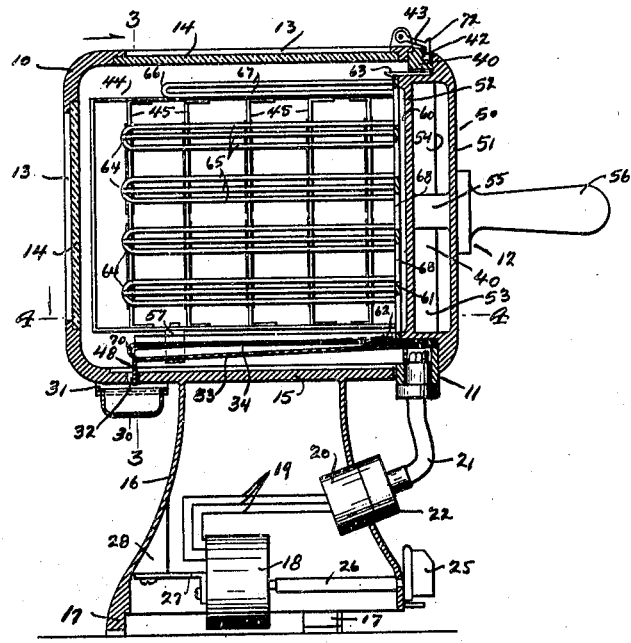
Fig. 1 is a side sectional elevation of my complete device with the grid element in its operative position.

My device comprises in general a casing 10, a heating element 11, and a grid element 12. The casing 10 is made preferably of sheet or cast material, having relatively thin walls, and provided on two sides, one end, and the top with openings 13 which are covered by panes of glass 14, thereby providing windows through which the cooking operation may be observed. The casing is preferably provided with a solid bottom 15 and is mounted upon a pedestal or base 16. This base is preferably hollow, as shown, and is supported by legs 17 or by a suitable flange (not shown). Mounted within the base 16 is the control switch 18 for controlling the electric current supplied to the heating element 11. This switch may be of any standard make and may have one, two, or three points of control, as may be desired. In the drawings, I have shown the switch as having three contact points whereby two degrees of heat may be supplied to the heating unit. These contact points are connected by suitable wires 19 to a three-point receptacle 20, which is secured to and carried by the base, and thus provides means for conveniently attaching and detaching the cable 21 extending to the heating unit. This cable has a three-point plug 22 of standard form for connection with the receptacle 20. The line current is connected to the switch 18 by well known means, which for clearness of illustration has not been shown. The control knob 25 of the switch is located preferably on the outside of the base near the bottom thereof and it is connected to the switch by a rod 26. The switch 18 may be carried by a bracket 27 which is secured to a lug 28 formed on the inside of the base. The casing is provided with a receptacle 30 which is slidably supported in grooved lugs 31, carried by the bottom 15 of the casing and arranged at points near the rear thereof. The bottom of the casing at this point is provided with a lateral slot 32. This slot registers with trays 33 and 34, carried, respectively, by the heating element 11 and by the grid element 12, whereby any grease dropping from the food will be conducted to and collected in the receptacle 30.

The front side of the casing 10 is not provided with a wall, but is closed by the flange 40 of the heating element 11. This flange is preferably so formed as to come flush with the casing and to provide rounded corners for the casing at that end. The flange is preferably formed with a hollow body, closed by a plate 58, thus providing suitable spaces for the passage of the necessary leads (not shown) for connecting the cable 21 to the resistance wire of the heating element. The flange is provided in its upper edge with a notched groove 42 with which a latch 43 is engageable, whereby the flange is held in place. Secured to the inner face of the flange 40 are two supporting frames 44, each comprising vertical bars 45 which are provided with the customary insulated apertures 46 through which the resistance wire 47 is passed. These supporting frames are arranged in interspaced relation and are separated a distance slightly greater than the width of the grid element 12. The resistance wire is threaded through the insulated apertures 46 in any suitable manner, and the terminals thereof are connected to the cable 21 in any of the well known ways. The resistance wire 47 has been omitted in Fig. 1 for clearness of illustration. The tray 33 which is carried by the heating element is provided with a downwardly extending lip 48 which enters the slot 42 formed in the base, and with upstanding flanges 49. The tray is supported near its outer end by means of a strap 57 which straddles the space between the supporting frames 44 and which is carried by such frames. Because of the structure just above described, the heating element is readily detachable from the casing by removing the plug 22 of the cable 21 from the receptacle 20 carried by the base 16, and by lifting the latch 43, whereby the interior of the casing may be readily cleaned as well as the heating element.

Figure 2:
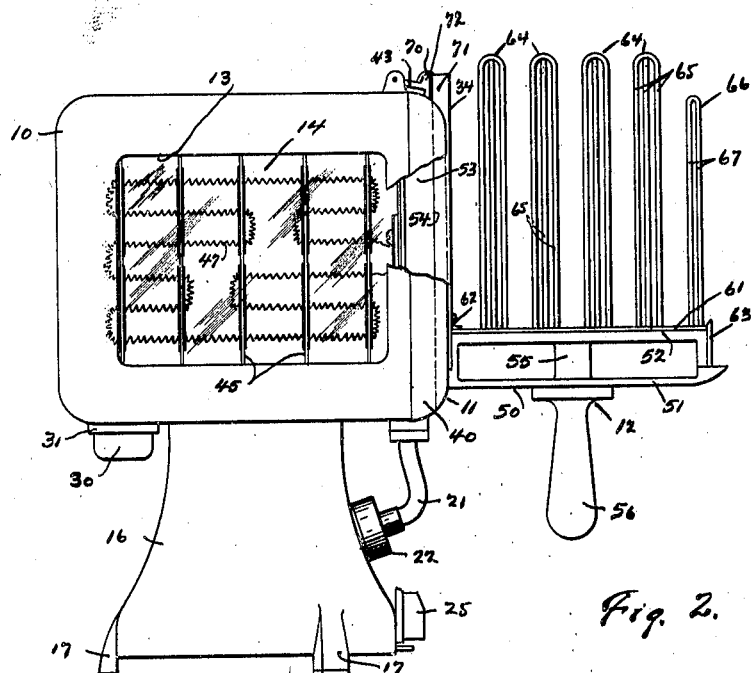
Fig. 2 is an exterior side elevation of my device with the grid element in the position which it occupies when roasted wieners are removed therefrom or when uncooked wieners are placed therein.
Figure 3:
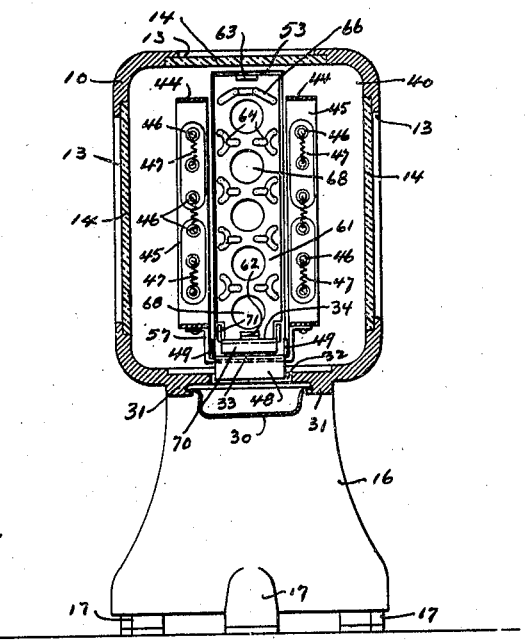
Fig. 3 is a transverse, vertical sectional elevation of my device taken on line 3—3 of Fig. 1.
Figure 4:
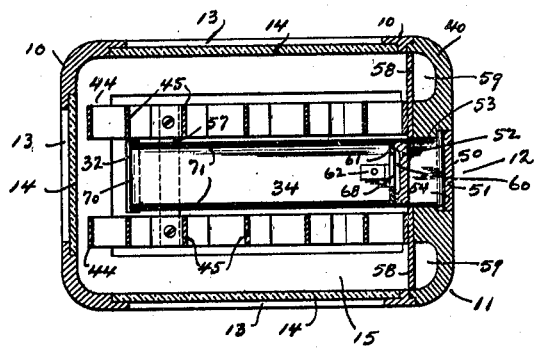
Fig. 4 is a sectional, plan view of my device, taken on line 4—4 of Fig. 1.

The grid element 12 of my device comprises a body part 50 having an outer wall 51 and an inner wall 52 arranged in interspaced relation. The body 50 of the grid fits into a vertical slot or opening 53 formed in the flange 40 of the heating element, and the outer wall 51 is wider than the slot 53 and bears against a recessed surface 54 at each side of the slot. The outer contour of the outer wall 51 is preferably such that it will come flush with the outer surface of the flange 40 thus giving a neat appearance. The outer and inner walls 51 and 52, respectively, are preferably connected near their central portions by means of an integral stud 55, into which is screw-threaded the handle 56 of the grid. The inner wall 52 of the body is preferably provided with a depression 60 over which is mounted the grid plate 61. This plate is detachably fastened to the body 50 of the grid element preferably by having one end passing under a lug 62, and its other end under a spring catch 63. The plate is provided with a plurality of wire fingers 64, each comprising preferably three wires 65 arranged in angular relationship, as shown in Fig. 3. Two short fingers 66 are arranged at the top end of the plate, each of which comprise but two wires 67. The fingers 64 and 66 are so arranged that longitudinal channels are provided between them for the support of the wieners. Holes 68 are provided in the grid plate 61, and one of these holes is in register with each of the longitudinal channels formed by the fingers. The holes 68 and the recess 60 provide means for the passage and collection of any grease which may drop from the wieners while they are being removed from the fingers when the grid is being supported in the position shown in Fig. 2. The tray 34 is attached to and carried by the body 50 of the grid element, and it preferably extends outwardly in parallel relation with the fingers 64, whereby any grease which drips from the wieners while they are being roasted will be caught and conducted to the outer end thereof where it will run over the lip 70, formed at its outer end. From this lip it will run down to the flange 48 of the tray 34 and be conducted through the slots 32 formed in the base and collected by the receptacle 30. The tray 34 is, of course, provided with side flanges 71. The lip 70 formed on the tray 34 engages with an upstanding lug 72 provided on the latch 43 when the grid is in the position shown in Fig. 2. When in this position the tray will be disposed in front of the slot 53 and thus serve to close this slot and retain the heat within the casing while the roasted wieners are being removed from the grid element, and while other wieners are being placed therein.

As above pointed out, the grid plate 61, carrying the fingers 64 and 66 may be easily removed from the base 50 of the grid element for the purpose of cleaning.

When the device is to be used, wieners are placed in the longitudinal channels formed by the fingers 64 and 66, and the grid element is then placed in position within the casing, and the switch 18 operated to turn on the current. After the wieners have been roasted, the grid element is removed and supported in the position shown in Fig. 2. It will thus be seen that since the tray 34 closes the opening 53 in the flange 40, the device is very economical in the consumption of current, since the heat will thus be retained within the body until the grid has again been loaded with fresh wieners and has been pushed into its roasting position.

Obviously, if desired, the grid element may with slight changes be made to accommodate other viands than wieners, such, for instance, as steaks or toast. These and other modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A cooking apparatus comprising a casing having an open end, a removable flange closing said open end, a heating element carried by the flange, and a grid element engageable with the flange and provided with means for supporting food to be roasted.

2. A cooking apparatus comprising a casing having a vertical slot in one end, heating means carried by the casing and arranged at each side of the slot, and a grid element having means for supporting the food being roasted, the grid element comprising a body for closing said slot when in one position, and a tray for closing said slot when in another position.

3. A cooking apparatus comprising a casing provided in its bottom with a slot, a grease receptacle slidably supported by the casing beneath the slot, a heating element detachably supported by the casing, a tray carried by the heating element, the tray having a flange at one of its ends engageable with the slot, a grid element carried by the casing, and having a tray superimposed over the tray of the heating element and having its outer end arranged near the slot.

4. A cooking apparatus comprising a casing provided in its bottom with a slot, a grease receptacle slidably supported by the casing beneath the slot, a heating element detachably supported by the casing, a tray carried by the heating element, the tray having a flange at one of its ends engageable with the slot, a grid element carried by the casing, and having a tray superimposed over the tray of the heating element and having its outer end arranged near the slot, the tray of the grid element having a lip at its outer end which is engageable with the casing for supporting the grid element when the grid is being loaded or unloaded.

5. A cooking apparatus comprising a casing having an open end, a flange arranged at the open end and having a groove in its upper edge, a latch carried by the body and engageable with the groove, two supporting frames carried in interspaced relation by the flange and arranged within the body, resistance wires carried by the supporting frames, the flange being provided with a slot, and a grid element engageable with the slot.

In testimony whereof, I have hereunto signed my name.

GEORGE ROSS LE SAUVAGE.